US009753905B2

(12) United States Patent
Bao et al.

(10) Patent No.: US 9,753,905 B2
(45) Date of Patent: Sep. 5, 2017

(54) GENERATING A DOCUMENT STRUCTURE USING HISTORICAL VERSIONS OF A DOCUMENT

(71) Applicant: INTERNATIONAL BUSINESS MACHINES CORPORATION, Armonk, NY (US)

(72) Inventors: Sheng Hua Bao, San Jose, CA (US); HongLei Guo, Beijing (CN); Zhili Guo, Beijing (CN); Davide Pasetto, Bedford Hills, NY (US); Wei Hong Qian, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 14/721,340

(22) Filed: May 26, 2015

(65) Prior Publication Data
US 2015/0339278 A1 Nov. 26, 2015

(30) Foreign Application Priority Data
May 26, 2014 (CN) .......................... 2014 1 0225252

(51) Int. Cl.
G06F 17/22 (2006.01)
(52) U.S. Cl.
CPC ...... *G06F 17/2288* (2013.01); *G06F 17/2211* (2013.01); *G06F 17/2241* (2013.01)

(58) Field of Classification Search
CPC ............. G06F 17/2288; G06F 17/2211; G06F 17/2241
See application file for complete search history.

(56) References Cited

U.S. PATENT DOCUMENTS

| | | | |
|---|---|---|---|
| 6,931,590 | B2 | 8/2005 | Kanie et al. |
| 7,162,501 | B2 | 1/2007 | Kupkova et al. |
| 8,527,480 | B1 | 9/2013 | Van Rotterdam et al. |
| 2013/0174025 | A1 | 7/2013 | Lee et al. |
| 2013/0262420 | A1 | 10/2013 | Edelstein et al. |
| 2014/0032510 | A1 | 1/2014 | Campbell et al. |
| 2015/0193435 | A1* | 7/2015 | Siddhartha .......... G06F 17/2288 707/756 |

* cited by examiner

*Primary Examiner* — Asher Kells
(74) *Attorney, Agent, or Firm* — Rabin Bhattacharya

(57) ABSTRACT

A method and apparatus for generating a document structure. The method includes the steps of: aligning various parts in the first version and the second version in at least one pair of historical versions among a plurality of historical versions of a document; dividing the first version and the second version into a plurality of blocks on the basis of a Levenshtein distance between the aligned parts; evaluating a level of the block in the document structure on the basis of text features of the block among the plurality of blocks; and generating the document structure on the basis of a position of the block according to an evaluation result. An apparatus for generating a document structure is also provided. According to the present invention, document structures can be more conveniently and rapidly generated.

19 Claims, 7 Drawing Sheets

200

210 Title
Patent Law of the People's Republic of China (Adopted at the 4th Session of the Standing Committee of the Sixth National People's Congress on March 12, 1984; Amended for the first time by the Decision Regarding the Revision of the Patent Law of the People's Republic of China, adopted at the 27th Session of the Standing Committee of the Seventh National People's Congress on September 4,1992; Amended for the second time by the Decision Regarding the Revision of the Patent Law of the People's Republic of China, adopted at the 17th Session of the Standing Committee of the Ninth National People's Congress on August 25, 2000)

220 Chapter
CHAPTER I: GENERAL PROVISIONS

230 Articles
Article 1...

Article 2...

Article 21...

CHAPTER II: REQUIREMENTS FOR GRANT OF PATENT RIGHT

240 Sub-articles
Article 22...
22.1...
22.2...

Article 23...

510 Version 1     520 Version 2

GENERATING A DOCUMENT STRUCTURE USING HISTORICAL VERSIONS OF A DOCUMENT

CROSS-REFERENCE TO RELATED APPLICATION

This application claims priority under 35 U.S.C. §119 from Chinese Patent Application No. 201410225252.4 filed May 26, 2014, the entire contents of which are incorporated herein by reference.

FIELD OF INVENTION

Various embodiments of the present invention relate to document management. More specifically, the present invention relates to a method and apparatus for generating a document structure on the basis of multiple historical versions of the document.

BACKGROUND

Long documents usually have complex document structures, via which users may rapidly find contents they desire to consult. In particular, documents such as laws, technical standards and contracts might comprise dozens of chapters and hundreds of articles. If a user cares only about a certain article in a given chapter of a document, without the assistance of a document structure, the user has to browse hundreds and even thousands of pages to find desired contents. The heavy workload is well imaginable.

Existing document editing tools offer a document structure setting function. The user may use these document editing tools to set a corresponding document structure for different parts of a document when editing the document. For example, a "title" level document structure may be set with respect to the title of the document, and a "chapter" level document structure may be set with respect to the first chapter in the document, etc. In other words, the user may set different levels of titles in the document, and further set other levels in each chapter. However, since many documents like laws and technical standards were promulgated years ago, they may only exist in printed paper versions instead of electronic versions, or even if an electronic version exists, the electronic version might only be in plain text and include no document structure information.

Further, it should be understood that a document structure may be manually extracted from a short document; however, generating a document structure for a long document that has been repeatedly modified over the years and includes hundreds and even thousands of pages becomes an issue.

SUMMARY

Therefore, it is desired to develop a technical solution capable of accurately and efficiently extracting a document structure from documents, and it is desired the technical solution may take into full consideration the similarity and difference between contents in a plurality of historical versions of the documents and generate the document structure from the plurality of historical versions through comparison. Further, it is desired the technical solution may be compatible with an existing technical solution for generating a document structure, and it is desired the document structure generated on the basis of the technical solution of the present invention may be combined with a document structure generated on the basis of the prior art so as to provide a more accurate document structure.

According to one aspect of the present invention, there is provided a method for generating a document structure. The method includes the steps of: aligning various parts in the first version and the second version in at least one pair of historical versions among a plurality of historical versions of a document; dividing the aligned parts of the first version and the second version on the basis of a Levenshtein distance into a plurality of blocks; evaluating a level of the block in the document structure on the basis of text features of the block among the plurality of blocks; and generating the document structure on the basis of a position of the block according to an evaluation result.

According to one aspect of the present invention, there is provided an apparatus for generating a document structure. The apparatus includes: an aligning module configured to align various parts in the first version and the second version in at least one pair of historical versions among a plurality of historical versions of a document; a dividing module configured to divide the aligned parts of the first version and the second version on the basis of a Levenshtein distance into a plurality of blocks; an evaluating module configured to evaluate a level of the block in the document structure on the basis of text features of the block among the plurality of blocks; and a generating module configured to generate the document structure on the basis of a position of the block according to an evaluation result.

With the method and apparatus described in the present invention, differences between a plurality of historical versions of one document may be taken into full consideration, and further, a document structure of the document may be extracted on the basis of the differences. In addition, the various embodiments of the present invention are implemented no matter in what language a document is drafted, and therefore the present invention may be applied to extract a document structure from a document drafted in any language.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

FIG. 2 schematically shows an example of page layout of a document with a document structure in different levels;

DETAILED DESCRIPTION

Some preferable embodiments will be described in more detail with reference to the accompanying drawings, in which the preferable embodiments of the present invention have been illustrated. However, the present invention can be implemented in various manners, and thus should not be construed to be limited to the embodiments illustrated herein. The embodiments provided are for the thorough and complete understanding of the present invention in order to completely convey the scope of the present invention to those skilled in the art.

Figure 1:
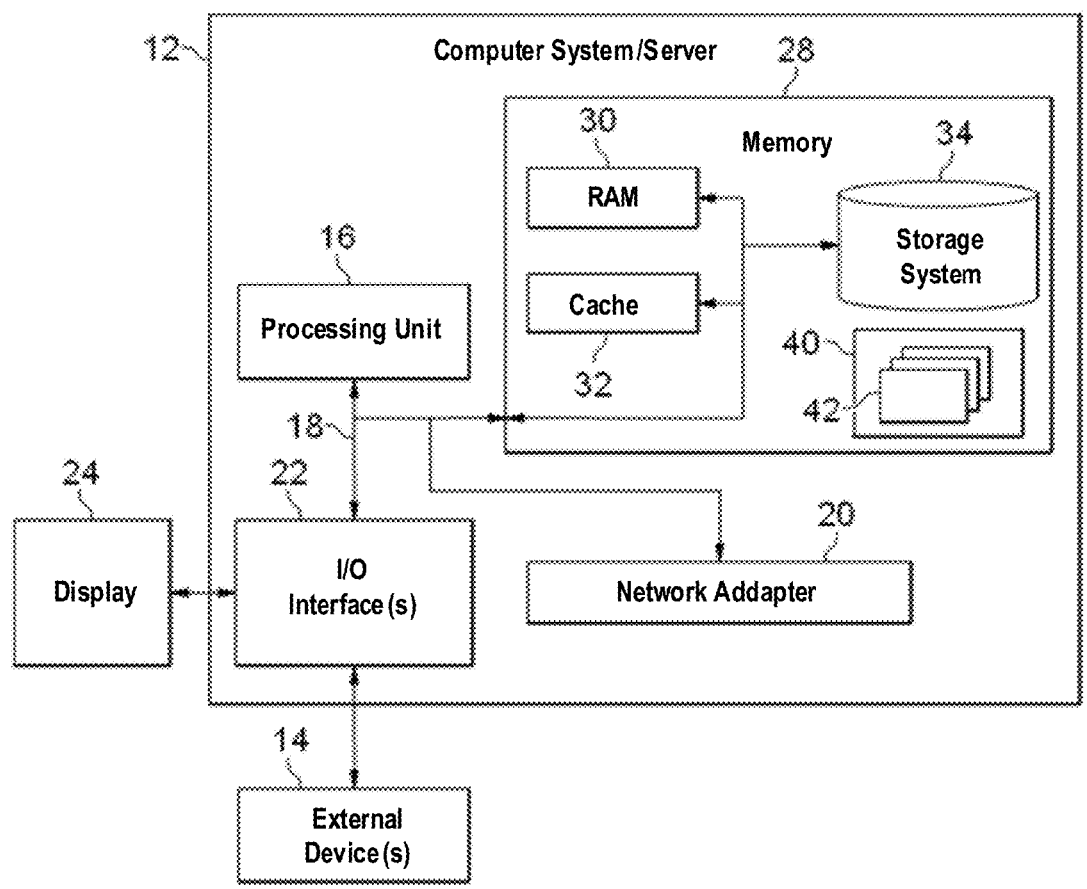
FIG. 1 schematically shows an exemplary computer system/server 12 which is applicable to implement the embodiments of the present invention.

Referring to FIG. 1, an exemplary computer system/server 12 is shown. Computer system/server 12 is only illustrative and is not intended to suggest any limitation as to the scope of use or functionality of embodiments of the invention described herein.

As shown in FIG. 1, computer system/server 12 is in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). A magnetic disk drive (not shown) for reading from and writing to a removable, non-volatile magnetic disk (e.g., a "floppy disk") can be used. An optical disk drive (not shown) for reading from or writing to a removable, non-volatile optical disk such as a CD-ROM, DVD-ROM or other optical media can also be used. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having at least one set of program modules 42 may be stored in memory 28. An operating system, one or more application programs, other program modules, and program data may also be stored in memory 28. Each operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate via Input/Output (I/O) interfaces 22 with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that other hardware and/or software components could be used in conjunction with computer system/server 12. Examples include, but are not limited to: microcode, device drivers, redundant processing units, external disk drive arrays, RAID systems, tape drives, and data archival storage systems, etc.

FIG. 2 schematically shows an example 200 of the page layout of a document with a document structures in different levels. Documents (especially long documents like laws and technical standards) may have complex structures. For example, the Patent Law of the People's Republic of China is a document that may have a document structure including a title 210, a chapter 220, articles 230, sub-articles 240 and other levels. In addition, the document may further contain cross references. For example, Article 1 of document 1 recites "please refer to Article * of technical standard *," and at this point the document structure may further include marks of "cross reference" type.

So far, some technical solutions for generating a document structure have been developed that contain drawbacks in different respects. According to one technical solution, a document structure may be extracted by identifying the document's layout. Specifically, as shown in FIG. 2, title 210 is centered in font size 3, and chapter 220 is centered in font size 4, at which point a document structure may be generated by identifying features like display mode, font, font size and indentation of various parts of the document.

However, the drawback of this technical solution is that many current documents do not have an electronic version and one can only be obtained by scanning and recognizing paper documents. During scanning and recognition, information in respects of font, font size and layout might be lost or errors might arise out of recognition. As a result, the electronic version is not an accurate basis for generating a document structure, and in turn an accurate document structure cannot be obtained.

Further there have been developed technical solutions for generating a document structure on the basis of analyzing the document's semantic contents. However, such analysis heavily depends on the language that is used for drafting the document. For example, in the document in FIG. 2, positions of each chapter and article may be located by searching for keywords "CHAPTER" and "Article." However, a document drafted in a different language would require experienced technicians to manually analyze a document structure and set keywords in a specific language. This technical solution is language-correlated, depends on the experience of technicians to a great extent, and cannot be applied to documents drafted in a different language. In addition, if the document shown in FIG. 2 is drafted in Chinese and the technicians do not read Chinese, then this technical solution does not work.

In addition, long documents like laws, technical standards and so on might have a plurality of historical versions. If it is desired to analyze a document structure of each historical version, by means of the prior art, each document needs to be analyzed one after another without considering correlations between various historical versions.

Therefore, it is desired to develop a technical solution capable of automatically generating a document structure from multiple historical versions of the document without manual manipulation, and it is desired that the technical solution can take into full consideration similarities and differences between contents in the document's multiple historical versions and extract a document structure from the multiple historical versions through comparison.

Figure 3:
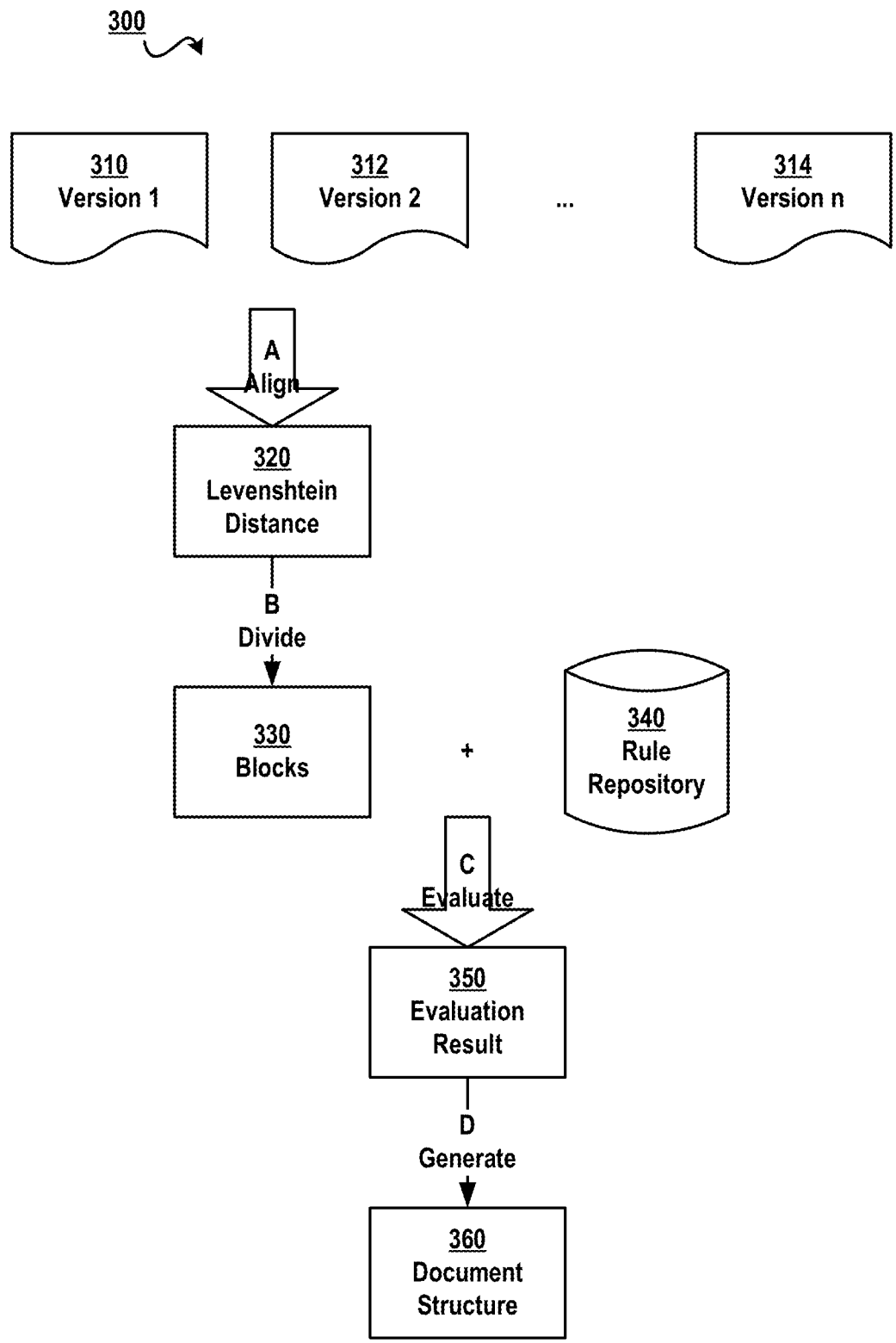
FIG. 3 schematically shows an architecture diagram of a technical solution for generating a document structure on the basis of a plurality of historical versions of a document according to one embodiment of the present invention.

In view of the drawbacks in the prior art, the various embodiments of the present invention propose a technical solution for generating a document structure on the basis of a plurality of historical versions of the document. FIG. 3 schematically shows an architecture diagram 300 of a technical solution for generating a document structure on the basis of a plurality of historical versions of the document according to one embodiment of the present invention. As shown in FIG. 3, suppose a given document has a plurality of historical versions, namely a version 1 310, a version 2 312, . . . , and a version n 314. At this point, contents in these versions may be aligned (as arrow A). Subsequently, a Levenshtein distance 320 is calculated with respect to aligned parts. The Levenshtein distance refers to, between two character strings, the minimum number of editing operations required to transform one character string into the other. So far there exist various algorithms for calculating the Levenshtein distance. Hereinafter, illustration will be presented of how to calculate the Levenshtein distance through a concrete example.

Still with reference to FIG. 3, each of various versions may be divided into a plurality of blocks on the basis of Levenshtein distance 320 (as shown by arrow B). For example, if it is found after the alignment that paragraphs 1-3 of version 1 310 are completely the same as paragraphs 1-3 of version 2 312 (i.e., the Levenshtein distance is equal to 0) while paragraphs 4-6 of version 1 310 are different than paragraphs 4-6 of version 2 312 (i.e., the Levenshtein distance is greater than 0), then paragraphs 1-3 in various versions are divided to one block and paragraphs 4-6 are divided to one block.

According to the present invention, a rule repository 340 may store rules for evaluating text features of a plurality of blocks. By evaluating blocks 330 on the basis of rule repository 340 (as shown by arrow C), an evaluation result 350 with respect to each block may be obtained, which evaluation result 350 may describe the level (e.g., title, chapter, article, etc.) of each block in the document structure. Subsequently, in the step as shown by arrow D, a document structure 360 is generated on the basis of evaluation result 350.

Note that it is found from statistical analysis that revisions made by people to documents mainly focus on positions of various levels in the document structure. For example, regarding the example as shown in FIG. 2, revisions might mainly focus on modifying the name of a chapter, inserting or deleting an article/sub-article, modifying version description at the head of a document, etc.

The present invention is implemented on the basis of the foregoing principle i.e., generates a document structure from a plurality of historical versions by taking into full consideration similarity and difference between these historical versions. Specifically, the various embodiments of the present invention propose a method for generating a document structure. The method includes the steps of: aligning various parts in the first version and the second version in at least one pair of historical versions among a plurality of historical versions of a document; dividing the aligned parts of the first version and the second version on the basis of a Levenshtein distance into a plurality of blocks; evaluating a level of the block in the document structure on the basis of text features of the block among the plurality of blocks; and generating the document structure on the basis of a position of the block according to an evaluation result.

Figure 4:
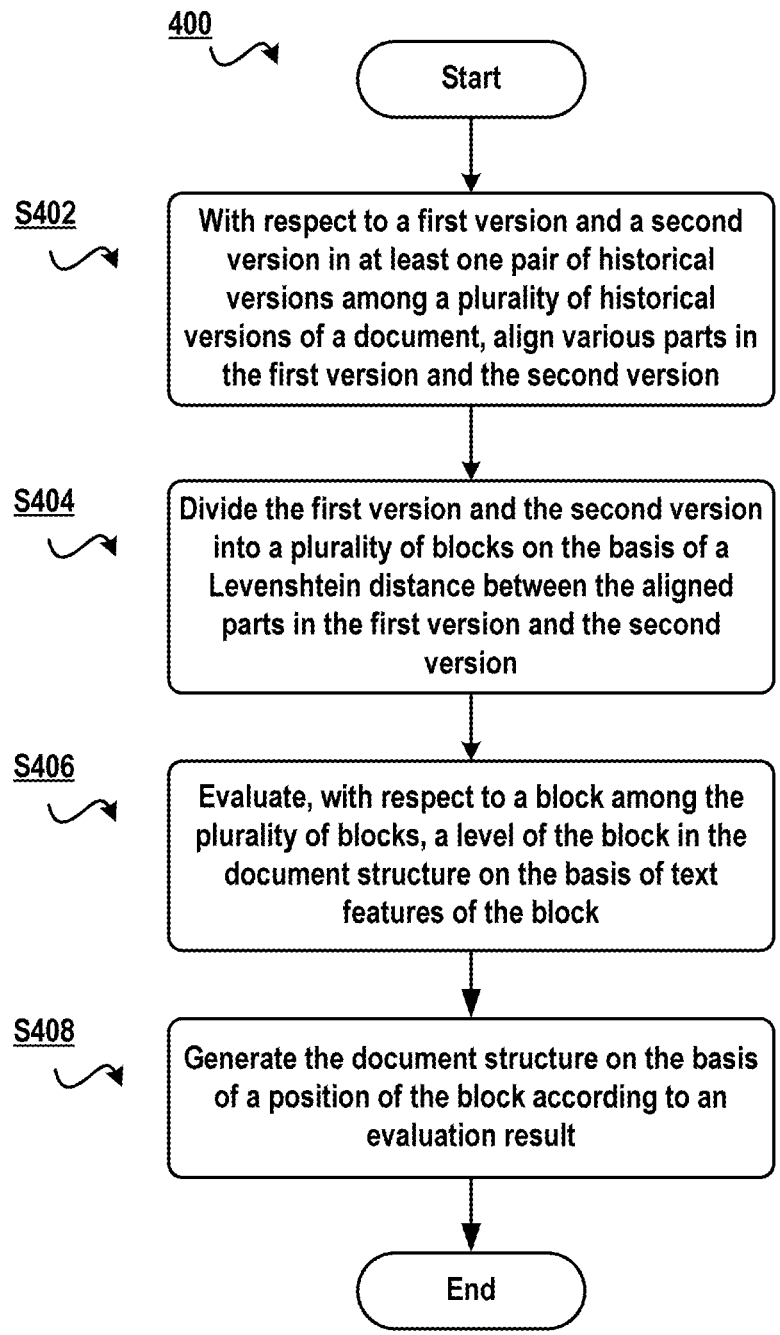
FIG. 4 schematically shows a flowchart of a method for generating a document structure on the basis of a plurality of historical versions of a document according to one embodiment of the present invention.

With references to FIGS. 4 to 7, detailed descriptions are presented below regarding concrete implementation details of the present invention. FIG. 4 schematically shows a flowchart 400 of a method for generating a document structure according to one embodiment of the present invention. In step S402 of FIG. 4, with respect to a first version and a second version in at least one pair of historical versions among a plurality of historical versions of a document, various parts of the first version and the second version are aligned. As a note, there are many mature algorithms for aligning content in a document that have been developed so far and the present invention is not limited to any particular algorithm used for alignment. Those skilled in the art may use any algorithm on the basis of specific application environment.

Any two different versions among the plurality of historical versions may be aligned. For example, where there are n historical versions, version 1 may be aligned with version 2 to version n, version 2 may be aligned with version 3 to version n, and so on and so forth. In the context of the present invention, a first version and a second version are illustrated to represent two historical versions. Those skilled in the art should note that the first and second versions do not refer in particular to two given versions among the plurality of historical versions, but may represent any two different versions among these historical versions. After executing step S402 for alignment, steps S404 to S408 may be executed to the first and second versions in any pair of historical versions.

In step S404, the first version and the second version are divided into a plurality of blocks on the basis of Levenshtein distances between the aligned parts in the first version and the second version. Nowadays, there exist mature algorithms for calculating the Levenshtein distance, so only a general introduction is given to the implementation step in the context of the present invention, and those skilled in the art may implement, by themselves, a concrete step.

For the purpose of simplicity, character strings are used as a concrete example of the aligned parts in the document. Suppose the aligned parts are a character string "kitten" in the first version and a character string "sitting" in the second version, respectively, then "kitten" may be transformed to "sitting" through steps as below:

Step 1: sitten (k→s)
Step 2: sittin (e→i)
Step 3: sitting (e→g)

The foregoing transformation comprises 3 operation steps, so a Levenshtein distance between the two character strings may be equal to 3. Regarding more details about how to calculate a Levenshtein distance, those skilled in the art may refer to http://en.wikipedia.org/wiki/Levenshtein_distance, which is not detailed in the context of the present invention. Although the aligned parts may comprise more characters (e.g., comprise a plurality of lines, paragraphs and even pages), those skilled in the art may calculate the Levenshtein distance on the basis of the foregoing principle, or those skilled in the art may modify a concrete algorithm for calculating the Levenshtein distance according to the needs of the concrete implementation environment.

After obtaining the Levenshtein distance, each version may be divided into a plurality of blocks. Subsequently, the operations in steps S406 to S408 may be executed with respect to each block resulting from the division. In step S406, a level of a block in the document structure is evaluated on the basis of text features of the block among the plurality of blocks. It is found that text features of a block are correlated to whether or not the block is a certain level in the document structure. For example, if a block has appeared in most versions among the plurality of historical versions, then it is highly possible the block is a level in the document structure (e.g., the contents might be from a "summary" chapter in the document. Although details in the document might be modified, contents in the "summary" chapter usually remain unchanged). With reference to FIG. 6 below, a detailed description is presented of how to evaluate a probability score of the block on the basis of the text features of the block through a concrete example.

Still with reference to step S408 in FIG. 4, the document structure is generated on the basis of the position of a block according to an evaluation result. Now that an evaluation result describing whether or not a block is a level in the document structure has been determined, a corresponding level in the document structure may be generated according to the evaluation result. Note that since a level in the document structure is at a start position of a paragraph, the position of the block may be a start position of the block in the present invention.

In the present invention, the plurality of blocks may come from any one version among the plurality of historical versions. A document structure may be generated with respect to each historical version on the basis of a start position of each block. For example, block A comes from historical version A, and then one level may be marked in historical version A on the basis of a start position of block A; if block B comes from historical version B, then one level may be marked in historical version B on the basis of a start position of block B. Using the technical solution of the present invention, a document structure may be generated with respect to each historical version concurrently.

In one embodiment of the present invention, dividing the first version and the second version into a plurality of blocks on the basis of a Levenshtein distance between the aligned parts in the first version and the second version includes: in response to the Levenshtein distance being greater than a predetermined threshold, identifying the parts as difference blocks; and in response to the Levenshtein distance being less than or equal to a predetermined threshold, identifying the parts as match blocks. In particular, blocks with a Levenshtein distance being equal to 0 may be identified as match blocks, and blocks with a Levenshtein distance being greater than 0 may be identified as difference blocks.

Figure 5:
FIG. 5 shows a schematic view of dividing a first version and a second version into a plurality of blocks according to one embodiment of the present invention.

FIG. 5 shows a schematic view 500 of dividing the first version and the second version into a plurality of blocks according to one embodiment of the present invention. In FIG. 5, the left column shows a schematic view of a version 1 510, and the right column shows a schematic view of a version 2 520. As shown in FIG. 5, the first paragraphs of these two versions are the same as each other, and their Levenshtein distance is equal to 0, so the first paragraphs of these two versions are identified as match blocks. By aligning version 1 510 with version 2 520, it is found that version 2 520 contains no content corresponding to the second paragraph in version 1 510, so the second paragraph in version 1 510 may be identified as a difference block. This is repeated so that versions 1 510 and 2 520 may be divided into a plurality of blocks.

In one embodiment of the present invention, generating the document structure on the basis of a position of the block according to an evaluation result includes: in response to the evaluation result meeting a predetermined condition, identifying the position of the block as a level in the document structure which is associated with the predetermined condition.

Since there exist different levels in the document structure, different predetermined conditions may be set with respect to different levels. Suppose the document structure comprises 4 levels, namely title, chapters, articles and sub-articles, and the evaluation result has a value range [0, 1], then at this point predetermined conditions may be expressed as below:

TABLE 1

Predetermined Condition of Evaluation Result

| No. | Level | Predetermined Condition of Evaluation Result |
| --- | --- | --- |
| 1 | Title | (0.8, 1] |
| 2 | Chapters | (0.6, 0.8] |
| 3 | Articles | (0.4, 0.6] |
| 4 | Sub-articles | (0.2, 0.4] |

Note the above Table 1 merely illustrates an example of predetermined conditions, and those skilled in the art may set other predetermined conditions on the basis of needs of a concrete application environment. For example, more or less levels may be set, and a document structure of header, footer and other types may be set. Further, predetermined conditions may be obtained from historical empirical values on the basis of statistical principles. Predetermined conditions may further be dynamically adjusted in the context of the present invention.

In one embodiment of the present invention, the text features describe an association relationship between text in the block and text in at least one historical version among the plurality of historical versions. Each block may have different text features. In the context of the present invention, text features of each block are not text features in the semantic sense. The various embodiments of the present invention do not identify semantic meaning of text in each historical version, but merely compare an association relationship between text in each block and text in each historical version, such as whether text is the same or different, positions of the block in various historical versions and other text features irrelevant to semantics.

In one embodiment of the present invention, evaluating a level of a block in the document structure on the basis of text features of the block among the plurality of blocks includes: analyzing an association relationship on the basis of a predetermined rule so as to evaluate a probability score that the block acts as a level in the document structure.

The evaluation result may be quantified in a numerical form. For example, the foregoing step may be implemented on the basis of statistical principles. Specifically, suppose a rule is summarized as below on the basis of previous experience: if text in a block appears in all historical versions, then the probability that the block acts as a level in a document equals 80%. On the basis of this rule, if it is found a given block has appeared in all historical versions, then the block's probability score is set as 80%.

In one embodiment of the present invention, the text features of the block include at least one of the following aspects: number of occurrences of the block in the plurality of historical versions; size of the block; positions of the block in pages of the plurality of historical versions; number of differences in the block; distribution style of differences in the block; and positions of differences in the block.

In the context of the present invention, the text features of the block may be described by a vector, and each of the above aspects may act as a component in the vector. Specifically, the score of each component may be described by a value between [0, 1]. For example, the score of the first component may be represented by an equation: the percentage of historical versions where the block appears to all historical versions. Suppose there are 10 historical versions and a certain block appears in 9 of these versions, then the first aspect of the block's probability score may be calculated as 9/10=0.9.

Experience shows the larger the number of occurrences of a block in a plurality of historical versions, the more stable the block's contents. Paragraphs with higher stability are usually located at a level such as chapters. So, a higher score may be assigned to a block that appears in multiple historical versions, whereas a lower score may be assigned to a block that only appears in a few historical versions. The calculation equation shown above is merely a concrete example and those skilled in the art may further calculate on the basis of other equations.

As another example, experience shows that for the "size of the block" aspect, the larger a block, the more likely the block acts as a level in the document structure. Also, the larger a block, the higher possibility that the block is located at a certain level in the document structure. So, higher scores are assigned to larger blocks and lower scores are assigned to smaller blocks. In this case, the score of a block whose size is greater than or equal to 2000 characters may be set as 1.0, and the score of a block whose size is in a range [1500, 2000) may be set as 0.8, etc.

Figure 6A:
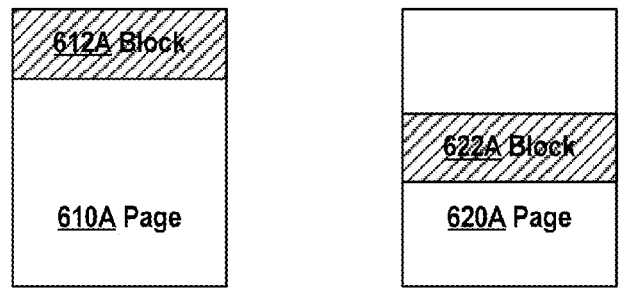
FIGS. 6A to 6C show schematic views of evaluating a probability score of a block on the basis of text features of the block according to one embodiment of the present invention.

Further, the probability score may be calculated on the basis of positions of the block in pages of the plurality of historical versions. FIG. 6A shows a schematic view 600 of evaluating a probability score of a block on the basis of text features of the block according to one embodiment of the present invention. In FIG. 6A, regarding a block 612A at the head of a page 610A and a block 622A in a page 622A, experience shows that the probability that block 612A is a level in the document structure is much greater, so a higher score (e.g., 1) may be assigned to blocks at the head (or tail) of a page.

For a difference block, a score may be set on the basis of the number of differences in the block. Specifically, the less differences (which may be denoted by the Levenshtein distance), the more stable the block. So, a higher score may be assigned to a block having less differences (e.g., a score of 1 may be assigned to a block whose differences are less than a threshold 1), while a lower score may be assigned to a block having more differences (e.g., a score of 0.2 may be assigned to a block whose differences are less than a threshold 2).

Figure 6B:
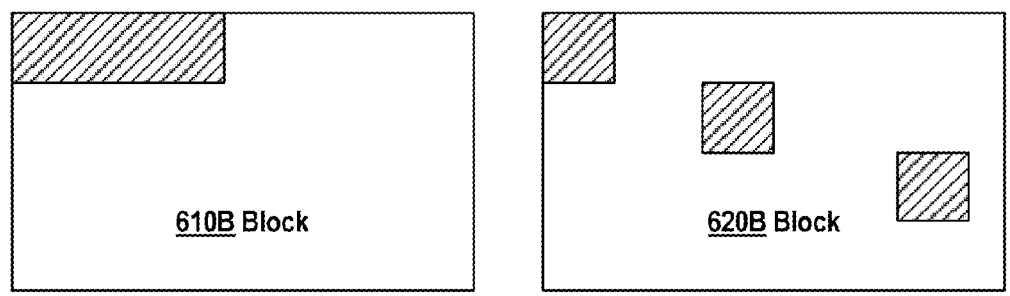

Further, a score may be set for a difference block on the basis of distribution style of differences in the block. FIG. 6B shows a schematic view 600B of evaluating a probability score of a block on the basis of text features of the block according to one embodiment of the present invention. In this figure, difference parts in a block are shown in shadow. The distribution of differences in a block 610B is concentrated, while the distribution of differences in a block 620B is rather scattered. Experience shows a block where differences are distributed in a concentrated manner is more likely to be a level in the document structure. So, a higher score may be assigned to a block with concentrated distribution of differences, and a lower score may be assigned to a block with scattered distribution of differences.

Figure 6C:
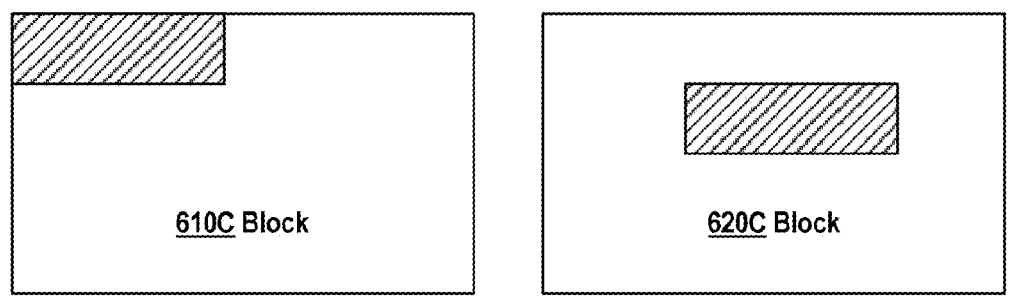

A score for a difference block may further be set on the basis of positions of differences in the block. FIG. 6C shows a schematic view 600C of evaluating a probability score of a block on the basis of text features of the block according to one embodiment of the present invention. In this figure, the difference part in a block is shown in shadow. In a block 610C, differences are located at the head of the block, and in a block 620C, differences are in the middle of the block. Experience shows that where differences of a block are located at the head and/or tail it is more likely to be a level in the document structure. So, a higher score may be assigned to a block where differences are located at the head and/or tail, and a lower score may be assigned to a block where differences are in the middle.

Examples for calculating a probability score for multiple aspects of a block that have been given above and the various example equations are only illustrative. Those skilled in the art may perform calculation on the basis of other equations. When calculating a probability score by considering the foregoing aspects, the probability score may be denoted in a multi-dimensional vector form, e.g., denoted as $Score(Score_{numberofoccurrences}, Score_{size}, Score_{position}, \ldots)$.

For example, suppose a block A is a match block and has appeared 9 times in 10 historical versions, the block size is 2500, and the block is located at the head of a page. On the basis of the score equation shown above, a probability score with respect to this block may be denoted as a vector Score (0.9, 1, 1, 0, 0, 0).

In one embodiment of the present invention, evaluating a level of the block in the document structure on the basis of text features of the block among the plurality of blocks includes: with respect to at least one aspect of the text features, calculating a score component and calculating the probability score of the block on the basis of the score component.

As per the description given above on how to calculate a score of each component in a probability score, the probability score may be calculated on the basis of scores of various components (e.g., by summating various components or weight-summating various components with respect to importance thereof). Those skilled in the art may use any appropriate weight on the basis of the needs of the concrete application environment. For example, weights with respect to the foregoing 6 aspects may be set as Weight (0.3, 0.2, 0.2, 0.1, 0.1, 0.1) or other values, which is not detailed here. Continuing the foregoing example, the probability score with respect to the block A is then calculated as:

$$Score = 0.9*0.3 + 1*0.2 + 1*0.2 + 0*0.1 + 0*0.1 + 0*0.1 = 0.67$$

According to the predetermined conditions shown in Table 1 above, when the probability score falls under a range (0.6, 0.8], the block A may be identified as a level "chapter" in the document structure.

In one embodiment of the present invention, aligning the various parts in the first version and the second version includes aligning the various parts in a minimum unit of lines. Each level in the document structure is located at a start position of a line rather than in the middle of a line, so the various parts may be aligned in a minimum unit of lines. Although on the basis of alignment algorithms in the prior art, sometimes an alignment position might be located in the middle of a line, since a level in the document structure will not start from the middle of a line, this alignment position may not be considered.

In one embodiment of the present invention, the plurality of historical versions are plain text files. The present invention is implemented on the basis of analysis of text in a historical version, without considering the historical version's features like font, font size, center alignment and so on. Therefore, as long as plain text files of the plurality of historical versions can be obtained using a method such as scanning recognition, the document structure can be generated on the basis of the present invention.

With the various embodiments of the present invention, requirements on inputted files are reduced greatly, and processing may be performed on documents drafted in various languages. For example, the technical solution of the present invention may be applied to a series of historical versions drafted in English and further without any modification, may be applied to historical versions drafted in French. Therefore, manpower, material resources and time costs for generating the document structure are saved significantly.

The present invention is implemented regardless of what languages the plurality of historical versions are drafted. The method of the present invention is implemented independently of language since the method does not make semantic analysis with respect to contents in the plurality of historical versions. The document structure may be automatically generated without analyzing the semantic meaning of the various historical versions.

In one embodiment of the present invention, the technical solution described above may further be combined with an existing technical solution for document structure extraction. For example, suppose a document structure 1 has been extracted on the basis of the prior art, and a document structure 2 has been extracted using the technical solution of the present invention. At this point, document structure 1 and document structure 2 may be "overlapped." For example, suppose in document structure 1, a maximum depth of the document structure as obtained on the basis of keyword search is "articles," while in document structure 2 a maximum depth of the document structure as obtained on the basis of the present invention is "sub-articles," then a level "sub-articles" may be added to document structure 1, and further document structure 1 is corrected on the basis of information of various levels in document structure 2 so as to obtain a finer-grained document structure.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules configured to execute the corresponding steps. Upon reading this specification, those skilled in the art may understand how to write a program for implementing actions performed by these means or modules. The apparatus is based on the same invention concept as the method, so the same or corresponding implementation details are also applicable to means or modules corresponding to the method. As detailed and complete description has been presented above, the apparatus is not detailed below.

Figure 7:
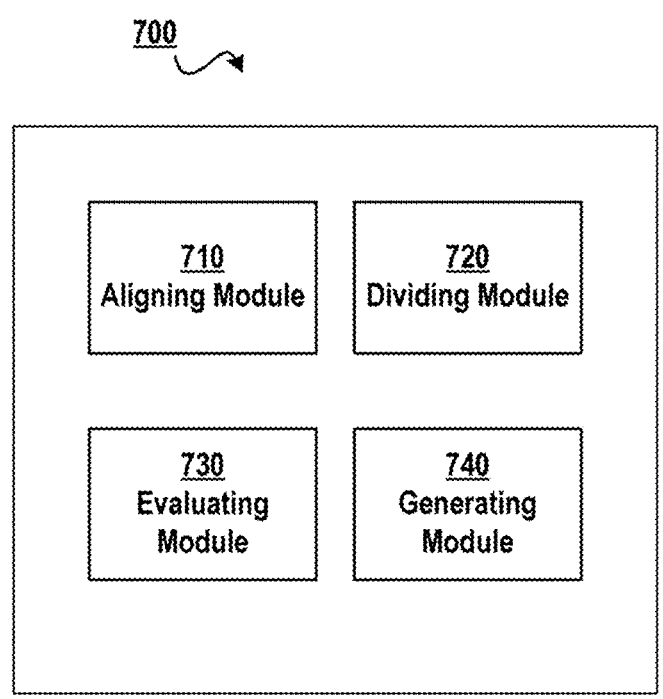
FIG. 7 schematically shows a block diagram of an apparatus for generating a document structure on the basis of a plurality of historical versions of a document according to one embodiment of the present invention.

FIG. 7 depicts a block diagram 700 of an apparatus for generating a document structure according to one embodiment of the present invention. Specifically, there is shown an apparatus for generating a document structure, including: an aligning module 710 configured to align various parts in a first version and a second version in at least one pair of historical versions among a plurality of historical versions of a document; a dividing module 720 configured to divide the first version and the second version into a plurality of blocks on the basis of a Levenshtein distance between the aligned parts in the first version and the second version; an evaluating module 730 configured to evaluate a level of a block in the document structure on the basis of text features of the block among the plurality of blocks; and a generating module 740 configured to generate the document structure on the basis of a position of the block according to an evaluation result.

In one embodiment of the present invention, dividing module 720 includes: a first identifying module configured to identify the parts as difference blocks in response to the Levenshtein distance being greater than a predetermined threshold; and a second identifying module configured to identify the parts as match blocks in response to the Levenshtein distance being less than or equal to a predetermined threshold.

In one embodiment of the present invention, generating module 740 includes: a level generating module configured to identify the position of the block as a level in response to the evaluation result meeting a predetermined condition, which is associated with the predetermined condition in the document structure.

In one embodiment of the present invention, the text features describe an association relationship between text in the block and text in at least one historical version among the plurality of historical versions.

In one embodiment of the present invention, evaluating module 730 includes: a probability evaluating module configured to analyze the association relationship on the basis of a predetermined rule so as to evaluate a probability score that a block among the plurality of blocks acts as a level in the document structure.

In one embodiment of the present invention, the text features of the block include at least: the number of the block's occurrences in the plurality of historical versions; size of the block; positions of the block in pages of the plurality of historical versions; number of differences in the block; distribution style of differences in the block; and positions of differences in the block.

In one embodiment of the present invention, the probability evaluating module includes: a first calculating module configured to calculate a score component with respect to at least one aspect of the text features; and a second calculating module configured to calculate the probability score of the block on the basis of the score component.

In one embodiment of the present invention, aligning module 710 includes: a line aligning module configured to align the various parts in a minimum unit of lines.

In one embodiment of the present invention, the plurality of historical versions are plain text files.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a document structure, comprising:
    aligning various parts in the first version and the second version in at least one pair of historical versions among a plurality of historical versions of a document;
    dividing the first version and the second version into a plurality of blocks on the basis of a Levenshtein distance between the aligned parts in the first version and the second version;
    evaluating a level of the block in the document structure on the basis of text features of the block among the plurality of blocks; and
    generating the document structure on the basis of a position of the block according to an evaluation result.

2. The method according to claim 1, wherein dividing the first version and the second version into a plurality of blocks on the basis of a Levenshtein distance between the aligned parts in the first version and the second version comprises:
    in response to the Levenshtein distance being greater than a predetermined threshold, identifying the parts as difference blocks; and
    in response to the Levenshtein distance being less than or equal to a predetermined threshold, identifying the parts as match blocks.

3. The method according to claim 1, wherein evaluating a level of the block in the document structure on the basis of text features of the block among the plurality of blocks comprises:
    analyzing an association relationship on the basis of a predetermined rule so as to evaluate a probability score that a block among the plurality of blocks acts as a level in the document structure.

4. The method according to claim 3, wherein the text features describe an association relationship between text in the block and text in at least one historical version among the plurality of historical versions.

5. The method according to claim 4, wherein the generating the document structure on the basis of a position of the block according to an evaluation result comprises:
    in response to the evaluation result meeting a predetermined condition, identifying the position of the block as a level which is associated with the predetermined condition in the document structure.

6. The method according to claim 5, wherein the text features of the block comprise at least one of:
    number of the block's occurrences in the plurality of historical versions;
    size of the block;
    positions of the block in pages of the plurality of historical versions;
    number of differences in the block;
    distribution style of differences in the block; and
    positions of differences in the block.

7. The method according to claim 6, wherein evaluating a level of the block in the document structure on the basis of text features of the block among the plurality of blocks comprises:
    with respect to at least one aspect of the text features, calculating a score component; and
    calculating the probability score of the block on the basis of the score component.

8. The method according claim 1, wherein aligning various parts in the first version and the second version comprises:
    aligning the various parts in a minimum unit of lines.

9. The method according to claim 1, wherein the plurality of historical versions are plain text files.

10. An apparatus for generating a document structure, comprising:
    an aligning module configured to align various parts in the first version and the second version in at least one pair of historical versions among a plurality of historical versions of a document;
    a dividing module configured to divide the first version and the second version into a plurality of blocks on the basis of a Levenshtein distance between the aligned parts in the first version and the second version;
    an evaluating module configured to evaluate a level of the block in the document structure on the basis of text features of the block among the plurality of blocks; and
    a generating module configured to generate the document structure on the basis of a position of the block according to an evaluation result.

11. The apparatus according to claim 10, wherein the dividing module comprises:
    a first identifying module configured to, in response to the Levenshtein distance being greater than a predetermined threshold, identify the parts as difference blocks; and
    a second identifying module configured to, in response to the Levenshtein distance being less than or equal to a predetermined threshold, identify the parts as match blocks.

12. The apparatus according to claim 10, wherein the evaluating module comprises:
    a probability evaluating module configured to analyze an association relationship on the basis of a predetermined rule so as to evaluate a probability score that a block among the plurality of blocks acts as a level in the document structure.

13. The apparatus according to claim 10, wherein the text features describe an association relationship between text in the block and text in at least one historical version among the plurality of historical versions.

14. The apparatus according to claim 13, wherein the generating module comprises:
    a level generating module configured to, in response to the evaluation result meeting a predetermined condition, identify the position of the block as a level which is associated with the predetermined condition in the document structure.

15. The apparatus according to claim 14, wherein the text features of the block comprise at least one of:
    number of the block's occurrences in the plurality of historical versions;
    size of the block;
    positions of the block in pages of the plurality of historical versions;
    number of differences in the block;
    distribution style of differences in the block; and
    positions of differences in the block.

16. The apparatus according to claim 15, wherein the probability evaluating module comprises:

a first calculating module configured to, with respect to at least one respect of the text features, calculate a score component; and a second calculating module configured to calculate the probability score of the block on the basis of the score component.

17. The apparatus according to claim 10, wherein the aligning module comprises:

a line aligning module configured to align the various parts in a minimum unit of lines.

18. The apparatus according to claim 10, wherein the plurality of historical versions are plain text files.

19. A computer readable non-transitory article of manufacture tangibly embodying computer readable instructions, which when executed, cause a computer to carry out the steps of the method according to claim 1.

* * * * *